US010993588B1

(12) United States Patent
Vukicevic et al.

(10) Patent No.: US 10,993,588 B1
(45) Date of Patent: May 4, 2021

(54) DISPENSING DEVICE WITH DISPOSABLE INSERT

(71) Applicant: BETTER & BETTER CO., New York, NY (US)

(72) Inventors: Vladimir Vukicevic, New York, NY (US); Jerry Hu, New York, NY (US); Mary Costa, New York, NY (US); Ciaran Murphy, New York, NY (US)

(73) Assignee: Better & Better Co., New York, NY (US)

( * ) Notice: Subject to any disclaimer, the term of this patent is extended or adjusted under 35 U.S.C. 154(b) by 0 days.

(21) Appl. No.: 16/822,924

(22) Filed: Mar. 18, 2020

(51) Int. Cl.
*B65D 35/02* (2006.01)
*A47K 5/18* (2006.01)
*B65D 35/10* (2006.01)
*B65D 35/46* (2006.01)
*B65D 47/20* (2006.01)

(52) U.S. Cl.
CPC ................ *A47K 5/18* (2013.01); *B65D 35/10* (2013.01); *B65D 35/46* (2013.01); *B65D 47/2031* (2013.01)

(58) Field of Classification Search
CPC ............... B05B 11/048; B05B 11/0072; B05B 11/0067; B05B 11/046; B65D 35/10; B65D 35/46; B65D 47/2031; B65D 83/0055; A47K 5/18
USPC ......................................... 222/105, 206–215
See application file for complete search history.

(56) References Cited

U.S. PATENT DOCUMENTS

| 4,047,642 | A | * | 9/1977 | Nilson | A61M 11/00 222/94 |
| 4,585,149 | A | * | 4/1986 | Zulauf | B65D 81/3244 222/144.5 |
| 4,798,311 | A | * | 1/1989 | Workum | B05B 11/0029 222/131 |
| 4,836,415 | A | * | 6/1989 | Grussmark | G04F 1/06 206/216 |
| 4,991,755 | A | * | 2/1991 | Grusmark | G04F 1/06 206/216 |
| 5,033,647 | A | * | 7/1991 | Smith | B05B 11/0072 222/94 |
| 5,505,342 | A | * | 4/1996 | Okamura | B65D 83/0055 222/212 |
| 5,934,457 | A | * | 8/1999 | Ueda | B65D 77/0493 206/204 |
| 6,142,344 | A | * | 11/2000 | Kai | B65D 75/5883 222/105 |

(Continued)

*Primary Examiner* — Charles P. Cheyney
(74) *Attorney, Agent, or Firm* — Bechen PLLC; Timothy J. Bechen

(57) ABSTRACT

A dispensing device includes an outer container made of a deformable material, the outer container includes a hollow interior cavity. The dispensing device includes an inner container affixable within the interior cavity of the outer container. The outer container is a re-usable container, the inner container can be a one-time use, disposable container, shipped to a customer on a periodic basis, including toothpaste. The inner container includes a nozzle for dispensing of the paste upon completion of assembly. The dispensing device includes a nozzle locking mechanism to secure the inner container to the cap. The cap includes a cap locking mechanism to secure the cap to the outer container. Upon assembly, applying a compression force to the outer container dispenses the toothpaste.

16 Claims, 5 Drawing Sheets

(56) References Cited

U.S. PATENT DOCUMENTS

| | | | |
|---:|---:|---|---|
| 6,510,965 B1* | 1/2003 | Decottignies | B05B 11/00412 |
| | | | 222/95 |
| 6,557,728 B1* | 5/2003 | Anderson | B65D 51/248 |
| | | | 222/39 |
| 8,033,413 B2* | 10/2011 | Gerson | B05B 7/2481 |
| | | | 220/315 |
| 8,646,658 B2* | 2/2014 | Bae | B65D 83/0061 |
| | | | 222/182 |
| 9,085,398 B1* | 7/2015 | Fellin | A47G 19/18 |
| 10,669,074 B2* | 6/2020 | Simpson | B65D 35/44 |
| 2009/0108034 A1* | 4/2009 | Bechyne | G04F 1/005 |
| | | | 222/638 |
| 2009/0179031 A1* | 7/2009 | Chen | B65D 35/28 |
| | | | 220/254.1 |
| 2019/0029393 A1* | 1/2019 | Chung | A45D 34/00 |

* cited by examiner

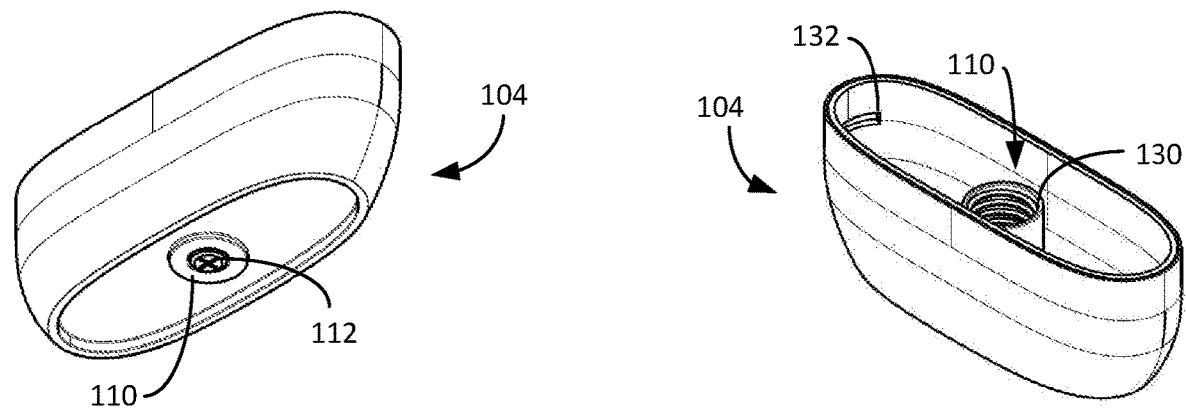
FIG. 8
FIG. 9
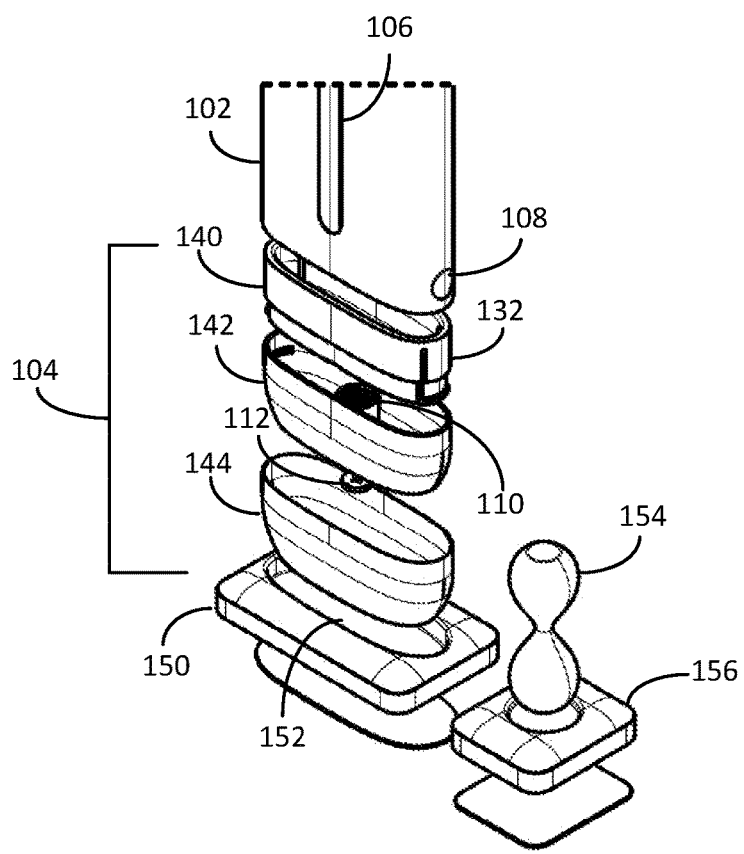
FIG. 10

DISPENSING DEVICE WITH DISPOSABLE INSERT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

There are no related applications.

FIELD OF INVENTION

The disclosed technology relates generally to a dispensing device for dispensing liquid or paste and more specifically to a dispensing device with a re-usable outer container and a disposable inner container of paste.

BACKGROUND

Packaging and delivery of consumer products is well known. Prior consumer marketplace models consist of manufacturers shipping large quantities of products to stores or regional distribution centers. These products are then stocked on shelves and consumers purchase directly from the stores.

Current economic trends provide for subscription-based services whereby consumers are sent periodic quantities of supplies. The consumer is then periodically sent replacements. Examples include shaving supplies sent on a monthly basis.

This trend greatly benefits the consumer, allowing them to subscribe to the monthly service. But this trend creates new concerns outside of prior consumer models. In prior models, manufacturers were not specifically concerned about shipping size and costs for individual packages. Rather, manufacturers previously delivered to stores via bulk shipments.

With periodic subscription models, products are delivered directly to the consumer. Delivery costs are typically based both on size and weight of the package. This additional overhead cost detracts from the attractiveness of this consumer model.

Another trend in consumer products is the reduction of waste associated with disposable or one-time use consumer products. This can include minimizing packaging for delivery products, as well as the amount of material used by the consumer product itself.

One example of a common consumer product is toothpaste. This product is sold to consumers via retail stores, such as shelves stocked with plastic tubes in cardboard boxes. These tubes are difficult to recycle. The current tube design also inhibits full evacuation of the paste, causing anywhere from 2% to 10% of the paste to be wasted. Moreover, there is currently no technology for re-usable toothpaste dispensing using multiple containers.

As such, there exists a need for product with a disposal device that works in a re-usable manner, but also minimizes container material. These is also a need for disposal device and packaging that cost effectively operates in a subscription service with minimizing shipping costs and other overhead for the consumer.

BRIEF DESCRIPTION

A dispensing device overcomes the limitations of the prior art to allow for a refillable consumer product accommodating periodic deliveries, while minimizing waste. The dispensing device includes an outer container made of a deformable material, the outer container includes a hollow interior cavity.

The dispensing device includes an inner container insertable within the interior cavity of the outer container. The outer container is a re-usable container, the inner container can be disposable. The inner container can be shipped to a customer on a periodic basis. The inner container includes a paste, such as a toothpaste.

The inner container includes a nozzle disposed at a bottom portion. The nozzle allows for dispensing of the paste upon completion of assembly. The nozzle includes a nozzle locking element disposed on the nozzle.

The dispensing device includes a cap with an aperture therein. The inner container is affixable to the cap by engaging the nozzle locking element to the cap, with the nozzle extending into the aperture.

The dispensing device further includes a closure valve associated with the nozzle and the aperture in the cap. The closure valve can be affixed within the cap or can be fitted on the inner container. The closure valve allows for passing toothpaste therethrough but providing a secure closure when not in use.

The cap also includes a cap locking element to secure the cap to the outer container. During assembly of the dispensing device, the inner container is secured within the cap. Then, the cap attaches to the outer container, securing the inner container within the outer container.

When applying a compression force to the outer container, this force squeezes the inner container causing the paste to dispense out the nozzle through the aperture in the cap.

Further embodiments of the dispensing device may include a base or other platform for holding the outer container. The base can include a recess for the cap to sit within, providing another form of seal or protection for the paste within the inner container.

The dispensing device can also include a timer element. The timer element can include a preset time interval associated with the dispensable paste. For example, the paste can be toothpaste, the timer can be a period of the recommended tooth brushing duration.

The outer container can also include a window allowing visibility to the inner container stored therein. The inner container can also be composed of an at least partial see-through material, allowing the user to visual determine a fill level of the paste stored therein.

The dispensing device allows for a replaceable inner container. A locking mechanism secures the cap to the outer container, but the cap is removeable. Once removed, the inner container can be withdrawn and a new replacement inner container inserted therein. Thereby, a user can receive a periodic shipment of toothpaste in disposable inner containers, maintaining the same outer container. The inner container can be composed of a biodegradable material, further reducing environmental impacts of consumer products. Moreover, the inner container is designed to minimize shipping costs associated with direct to consumer shipping.

BRIEF DESCRIPTION OF THE DRAWINGS

A better understanding of the disclosed technology will be obtained from the following detailed description of the preferred embodiments taken in conjunction with the drawings and the attached claims.

FIG. 8 illustrate a first view of one embodiment of a cap;

FIG. 9 illustrates a second view of one embodiment of the cap of FIG. 8;

FIG. 10 illustrates an exploded view of one embodiment of a dispenser device with a timer device.

DETAILED DESCRIPTION

The present dispensing device and component system overcomes problems associated with waste and provides a new solution to consumer delivery and consumption of daily-use products.

Figure 1:
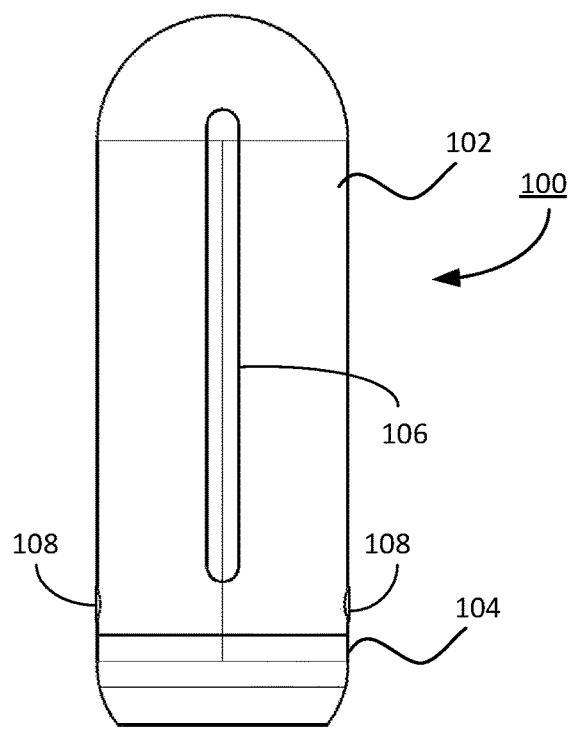
FIG. 1 illustrates a front view of one embodiment of a dispenser device.

FIG. 1 illustrates a front view of one embodiment of a dispensing device 100 including an outer container 102 and a cap 104. The outer container 102 can be disposed in any suitable shape, having a hollow interior (not visible in FIG. 1).

The outer container 102 is a reusable container or bottle. This outer container 102 is structurally designed to encompass an inner container and allow for dispensing toothpaste.

The outer container 102 is disposed of a collapsible or bendable material, such as a soft-weight plastic. For example, the outer container can be composed of soft plastics, such as a thermoplastic elastomer. In another example, the outer container can be composed of different materials or multiple plastics having varying elasticity. For example, in one embodiment the outer container can include a hard plastic or metal outer edge, with softer plastic interior or middle section for dispensing paste.

Not visible in FIG. 1, an inner container is disposed within outer container, secured in place by connection to the cap 104. External compression on the outer container 102 translates to compression on the inner container, allowing for dispensing via the cap 104.

The cap 104 attaches to the outer container 102 using a compression or snap-fit mechanism, as described in greater detail below. The cap 104 closes the interior portion, securing the inner container therein.

In one embodiment, the outer container 102 can include a window 106. The window 106 can be fully see-through or at least partially see-through, allowing visibility to the inner container stored therein. Visibility allows the user to determine the amount of toothpaste remaining in the inner container. The window 106 can be made of the same plastic or deformable material, such as using varying coloring or composite material. The window 106 can also be made of a different material or the same material with a varying degree of hardness or deformability.

Further visible in FIG. 1 are cap locking elements 108. As described in greater detail below, the cap locking elements 108 provide for securing the cap 104 to the outer container 102 and allowing for disengaging the cap 104 therefrom.

Figure 2:
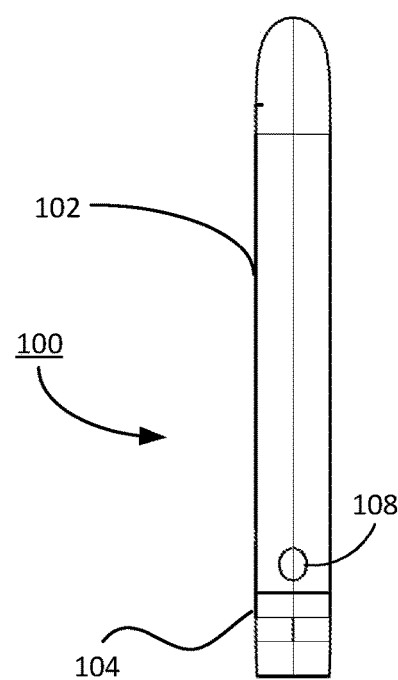
FIG. 2 illustrates a side view of the dispenser device of FIG. 1.

FIG. 2 illustrates a side view of the dispensing device 100, showing the side view of the outer container 102 and the cap 104. Similar to FIG. 1, the cap 104 is affixed to the outer container 102. In this embodiment, the cap 104 includes a flat front face, allowing for resting the dispensing in the device in an upright position.

In this embodiment, the window 106 of FIG. 1 is flush within the front face surface of the outer container, therefore not expressly illustrated in FIG. 2 as not be directly visible from the side view. The cap locking element 108 is additionally visible, illustrated in this embodiment as a depressible button. Once the button is depressed, the internal features of the locking element (not visible in FIG. 2) releases pressure engagement against the cap 104.

Figure 3:
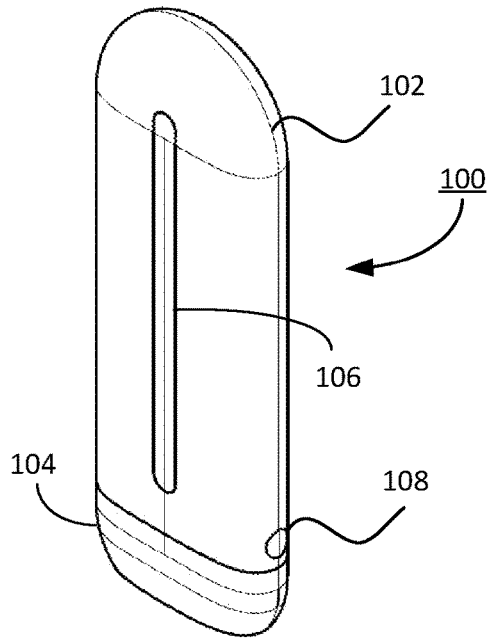
FIG. 3 illustrates a perspective view of the dispenser device of FIG. 1.

FIG. 3 illustrates a perspective view of the dispensing device 100, providing further illustration of the outer container 102, the cap 104, the window 106, and the cap locking element 108. As visible in this embodiment, the outer container 102 has an elongated shape with a curved top. Whereas it is recognized the present shape is illustrative of one embodiment and not expressly limiting. The outer container 102 can utilize any suitable shape or design that provides for dispensing toothpaste and connectivity with cap 104, as described herein.

Figure 4:
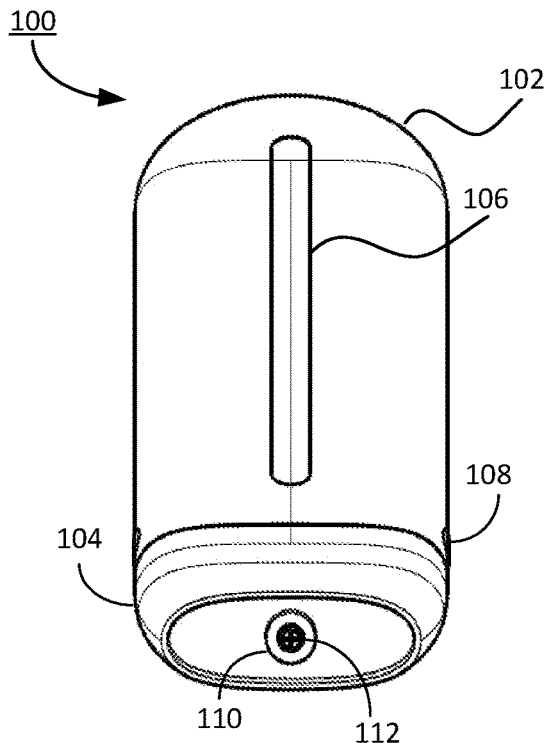
FIG. 4 illustrates another perspective of the dispenser device of FIG. 1.

FIG. 4 illustrates another perspective view of the dispensing device 100, from a bottom perspective. The dispensing device 100 can be stored in an upright position, enabled by the cap 104 having a flat front edge. As described in greater detail below, one embodiment includes a base having a recess with a mating shape for receiving the cap 104 and securely storing the dispensing device 100.

As visible in FIG. 4, the outer container 102 includes the window 106 and the cap 104 is secured to the outer container via the cap locking element 108. Further visible, the cap 104 includes an aperture 110. While not expressly visible in FIG. 4, the aperture extends the length of the cap 104, with a nozzle of the inner container secured therein.

Also visible in FIG. 4, a closure valve 112 is secured within the aperture 110. The closure valve 112 may be a plastic element having a default closed position, but when an external force is applied, the valve opens and allows for liquid or paste to pass therethrough. As described in greater detail below, the valve 112 engages the inner container secured within the outer container, allowing for dispensing of paste when pressure is applied to the exterior of the outer container 102.

In one embodiment, the closure valve 112 can be disposed or affixed within the aperture 110. In another embodiment, the inner container may include a closure valve at the end of its nozzle.

In one embodiment, the cap 104 may further include a lid. The lid can be opened via a plastic hinge mechanism, creating a further closure for maintaining the integrity of the paste within the inner container.

Figure 5:
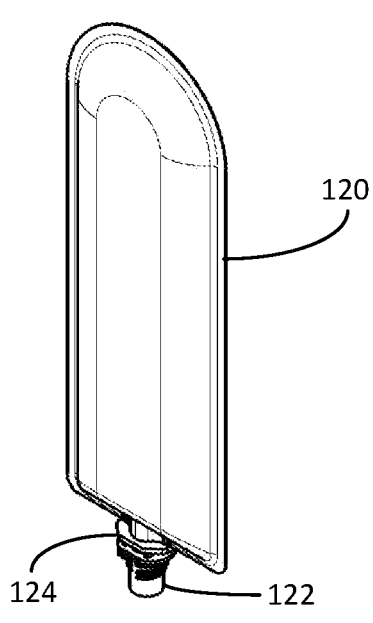
FIG. 5 illustrates a perspective view of one embodiment of an inner container.

FIG. 5 illustrates one embodiment of an inner container 120. The inner container 120 may be a lightweight plastic pouch, such as constructed from a flexible, collapsible material, such as nylon. The inner container 120 can hold a liquid or paste, such as toothpaste.

The inner container 120 is made of a material not intended for direct consumer handling or directly squeezed by the consumer on a daily basis. Rather, the inner container 120 is designed to be placed within the outer container (102 of FIG.

1). For example, the inner container 120 includes an internal pouch storing the toothpaste with a fused outer ridge providing rigidity.

The inner container 120 has minimal material usage in its construction. The inner container 120 can have a smaller material-mass to toothpaste-mass ratio compared with traditional toothpaste tubes. The placement of the inner container 120 within the outer container (102 of FIG. 1) allows for thinner or minimal material usage to ensure the container integrity for holding and dispensing liquid or paste.

In one embodiment, the inner container 120 may include a nozzle 122 affixed at a bottom end. The nozzle 122 operates consistent with known nozzle technology, allowing for the toothpaste within the inner container 120 to pass through upon force activation upon the inner container 120. The nozzle 122 includes an aperture for allowing the paste to travel therethrough.

The nozzle 122 further includes a nozzle locking element 124 disposed on the exterior of the nozzle 122. In one embodiment, the nozzle locking element 124 is a grooved element for mating with the cap, as described in greater detail below. The locking element 124 can be a grove allowing to screw or snap-fit the nozzle into the cap. Moreover, the locking element 124 can be any suitable mechanical means to affix and secure the cap to the nozzle 122.

Figure 6:
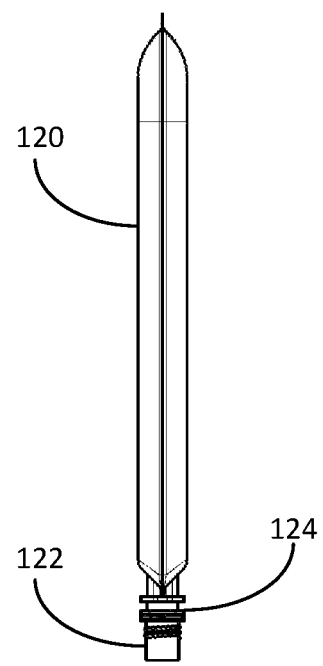
FIG. 6 illustrates a side view of the inner container of FIG. 5.

FIG. 6 illustrates a side view of the inner container 120, illustrating the thickness of this embodiment. Moreover, the pouch shape with the rigid edges provides for improved dispensing of paste and maintaining structural integrity once installed. Also visible are the nozzle 122 and the nozzle locking elements 124.

Figure 7:
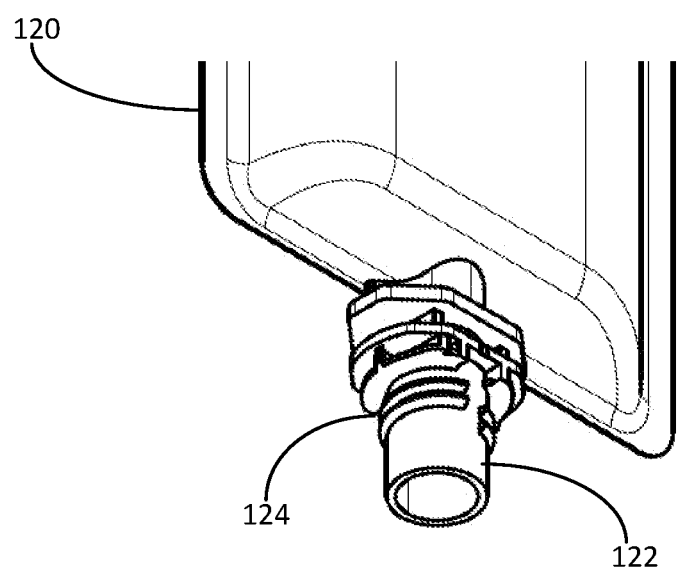
FIG. 7 illustrates an enlarged view of the nozzle of the inner container of FIG. 5.

FIG. 7 illustrates another perspective view of the inner container 120 with the nozzle 122 and the nozzle locking element 124. Visible in FIG. 7, the nozzle locking element 124 includes the raised groves with a stop cap for controlling not only the depth of the nozzle 122 within the aperture of the cap, but also to control the amount of insertion force or twisting required.

Also visible in FIG. 7, the nozzle 122 is a pathway allowing for toothpaste to pass therethrough.

In a further embodiment, the inner container 120 can be shipped to the consumer with a protective seal covering the nozzle 122, such as being affixed with a small amount of adhesive material. The seal ensures the integrity and freshness of the paste inside the inner container 120 during transport to the consumer and prior to installation within the outer container.

The user can manually remove the seal either just before or after installation of the inner container. Whereas, as noted in further detail below, once installed, the paste is kept fresh based on the cap, such as a lid or a closure valve.

FIGS. 8 and 9 illustrate varying perspective views of the cap 104. Visible in FIG. 8, the cap 104 includes the bottom of the aperture 110 and the closure valve 112. Visible in FIGS. 8 and 9, but described in greater detail with respect to FIG. 10, the cap 104, in this embodiment, is composed of three different segments.

FIG. 9 illustrates the top view of the cap 104. Visible are mating grooves 130 within the aperture 110 and cap locking tabs 132 on the interior of the cap.

FIG. 10 illustrates an exploded view of the assembly of the cap 104 and the outer container 102. The outer container 102 includes the window 106 and the cap locking elements 108.

The cap locking elements 108 further include the cap locking tabs 132 as part of the cap 104. In this embodiment, the cap 104 is composed of three primary segments, a first segment 140 having the cap locking tabs 132, a second segment 142 with the aperture 110, and a third segment 144 as the bottom portion.

The cap 104 and the segments 140, 142, and 144 can be made of molded plastic, similar material, or any other suitable material. The segments 140, 142, and 144 can be affixed together to form the cap 104. For example, in varying embodiments, the segments can be glued together or can be snap-fitted.

Also visible in the exploded view, the closure valve 112 sits at the bottom of the aperture 110.

FIG. 10 further illustrates a further embodiment with a base 150. The base 150 can be made of any suitable material, having a recess or groove 152 providing for the cap 104 to sit therein.

The base 150 may further include a supplemental base element 154 holding a timer element 156 therein. The timer 156, in this embodiment, may be a manually-operated hour-glass shaped timer. The timer 156 can include sand or other material designating the recommended time for brushing one's teeth. The user can, in this embodiment, manually flip the timer for controlling the tooth brushing duration.

Further embodiments may include additional components associated with the dispensing device. For example, one embodiment may include a base tray for holding the dispensing device. The base tray can include electronics, such as detecting the number of times the dispensing device is activated or a timer providing a countdown until a next delivery is requested or required.

A further embodiment can include a timer, whether it be an electrical or mechanical timer. For instance, the timer can provide a timed countdown for how long the user should be engaged in brushing his or her teeth, such as the two minutes per brushing session recommended by the American Dental Association.

The timer can be a stand-alone device, such as found in the base, or can be associated with the dispensing device. For example, a sensor can detect when the outer container is removed from a base station, this can begin the timer. In another example, a timer can be fitted in the outer container, beginning timing either upon detecting toothpaste dispensing or movement by the user.

Figures 11, 12:
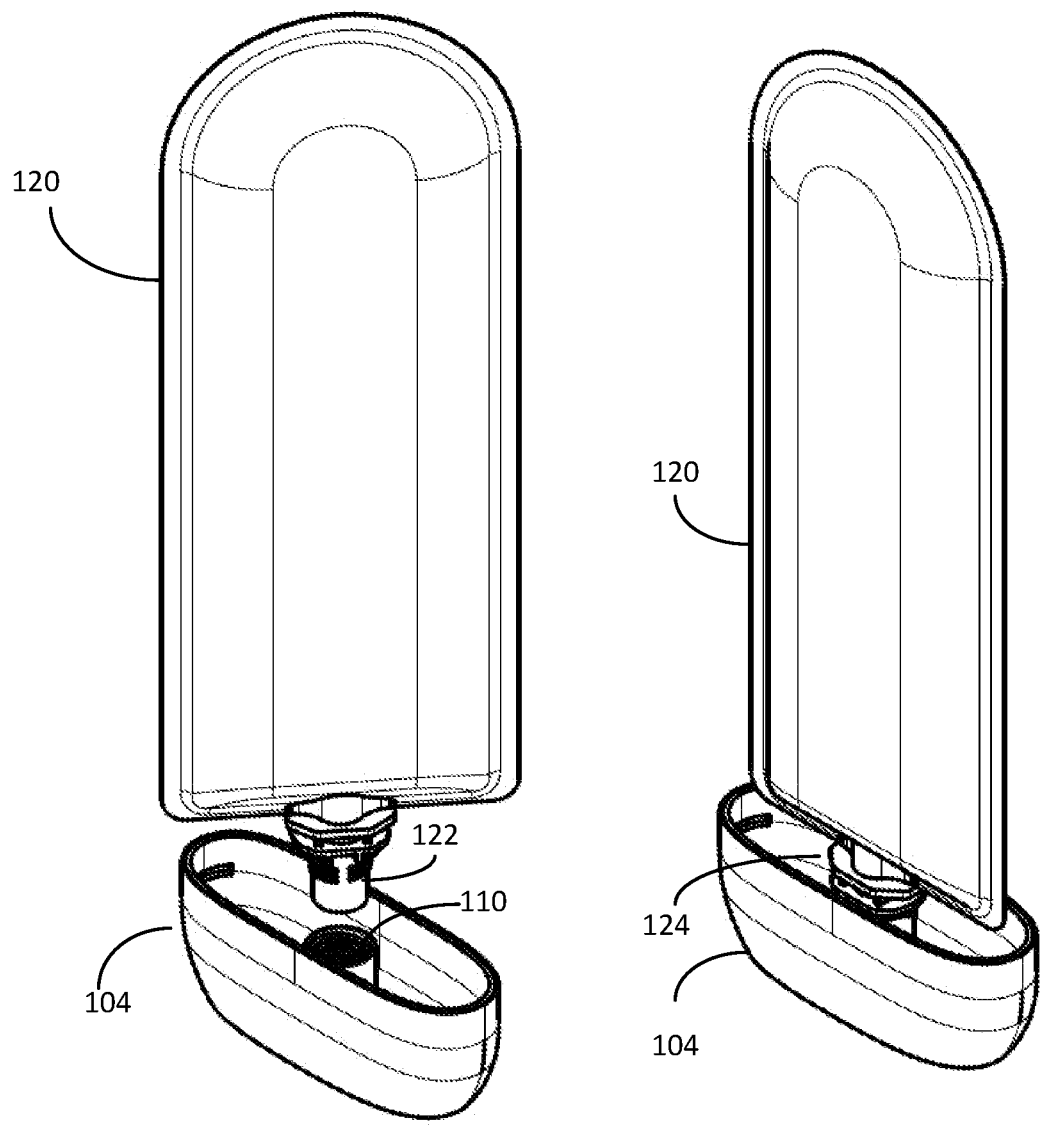
FIGS. 11-13 illustrate steps in the dispensing device assembly.

The dispensing device provides for replacement inner containers. Therefore, the device allows for assembly and re-assembly. FIG. 11 illustrates assembling or securing the inner container 120 within the cap 104. The nozzle 122 extends into the aperture 110.

FIG. 12 illustrates the inner container 120 is affixed within the aperture by, in this embodiment, rotating the inner container 120 to screw the nozzle and the nozzle locking element 124 in place. Thereby, the inner container 120 is secured to the cap. The rigidity of the inner container 120 allows the inner container 120 to remain upright.

It is noted, for removing the inner container 120, for example once all toothpaste has been expelled, the twisting process is reversed. Thus, in this embodiment, the inner container 120 can be removed by unscrewing from the cap 104.

Figure 13:
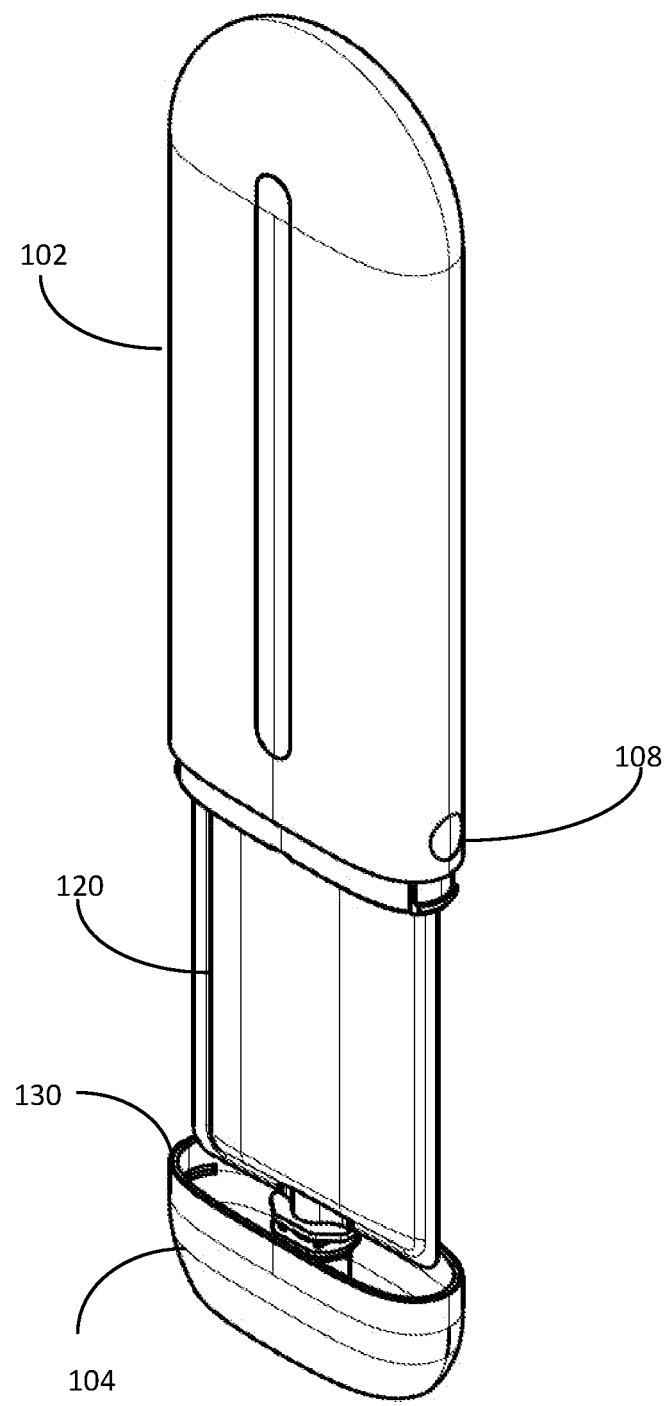

FIG. 13 illustrates the further assembly process, whereby the outer container 102 slides over the inner container 120. As the outer container 102 slides down, the cap 104 secures to the outer container 102 via the cap locking mechanisms 108. In this embodiment being snap-fit connections.

Similar to FIG. 12, the removal and replacement of the inner container follows the reverse operation. Compression of the cap locking mechanism 108 removes the snap-fit or compression engagement with the mating grooves 130 of the cap 104. The cap 104 can then be slid apart from the outer container 102.

In the embodiment where the closure valve is secured within the cap 104, installation of the inner container 120 can include removal of a protective seal on the nozzle.

Further embodiments can provide for varying designs and shapes for the outer container 102, the inner container 120 and the cap 104. For example, a decorative cap can include a decorative finish, such as a polished metal, providing improved visual aesthetics. The cap can include a logo or other writing.

During normal operations, a user can receive monthly or periodic shipments of inner containers. The inner container includes toothpaste or other type of paste. The outer container is a re-usable container, the inner container being a one-time use, disposable container It is recognized that the outer container may utilize any suitable shape. The shape can be determined by material waste features, design features, ease of use, or any other factors. The inner container generally mirrors the outer container design, but it not expressly required. For instance, the outer container may have a unique shaped design and the inner container has a smaller material footprint in a tube-based shape accommodated within an interior portion of the outer container.

Further design embodiments of the outer container may include external force application means for compressing the inner container. Where noted above human compression deforming the outer container causes paste extraction, other compression techniques can be utilized. For instance, a mechanical means applying a preset amount of pressure can be used, such as depressing a button that translated the button pressing into a specific force generation. Other techniques can include battery or electrically powered regulated compression forces upon the inner container.

Further embodiments may utilize external monitoring and toothpaste extraction techniques. For example, the outer container may include mechanical or electrical triggers for compressing the inner container. Triggers can include buttons, voice activation, movement activation, or any other suitable technique.

Further embodiments may include multiple inner containers or a single inner container having multiple channels. For example, one embodiment may include a combination of liquid and solid dispensing elements. In one example, a toothpaste can be dispensed from one channel, mixed with other paste or with a powder or liquid. The present dispensing device is not expressly limited to a single inner container usable with the outer container.

FIGS. 1 through 13 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A dispensing device comprising:
   an outer container having a hollow interior cavity, the outer container composed of a deformable material;
   a first inner container insertable within the hollow interior cavity of the outer container, the first inner container storing a toothpaste therein;
   a nozzle disposed at a bottom portion of the first inner container, the nozzle including a nozzle locking element disposed thereon; and
   a cap having an aperture extending therethrough, the cap mating the nozzle locking element for securing the first inner container to the cap with the nozzle extending into the aperture;
   a closure valve disposed within the aperture, the nozzle in contact engagement with the closure valve; and
   a cap locking element including a plurality of depressible buttons with cap locking tabs for secure engagement of the cap to the outer container with the first inner container secured therein;
   wherein the first inner container being secured within the outer container via the nozzle locking element provides for dispensing of the toothpaste via the nozzle and through the aperture in response to an external compression force applied to the outer container, the closure valve securing the nozzle when not dispensing toothpaste;
   a second inner container insertable within the hollow interior cavity of the outer container;
   wherein when the first inner container is disengaged from within the outer container, the second inner container engages the nozzle locking element to replace the first inner container therein; and
   a base component having a recess therein, the recess having a shape mating the cap, wherein the placement of the cap connected to the outer container rests within the base component to inhibit airflow to the closure valve.

2. The dispensing device of claim 1, wherein the outer container includes a window allowing visibility into the inner container secured therein.

3. The dispensing device of claim 2, wherein the outer container and the window are both made of a deformable plastic.

4. The dispensing device of claim 2, wherein the inner container is made of an at least partially see-through plastic material allowing visual confirmation of an interior toothpaste volume.

5. The dispensing device of claim 1 further comprising:
   a lid affixed to the cap including at least one hinge mechanism for opening the lid to facilitate dispensing the paste from at least one of: the first inner container and the second inner container.

6. The dispensing device of claim 1 further comprising:
a timer element, which when activated tracks a preset time interval.

7. The dispensing device of claim 6, wherein the paste is a toothpaste and the preset time interval is a time interval for tooth brushing.

8. The dispensing device of claim 6, wherein the timer element is disposed within the outer container.

9. A dispensing device comprising:
- an outer container having a hollow interior cavity, the outer container composed of a deformable material, the outer container includes a window therein;
- a first inner container insertable within the hollow interior cavity of the outer container, the first inner container storing a toothpaste therein, a volume of the toothpaste in the first inner container visible through the window in the outer container;
- a nozzle disposed at a bottom portion of the inner container, the nozzle including a nozzle locking element disposed thereon;
- a cap having an aperture extending therethrough, the cap mating the nozzle locking element for securing the inner container to the cap with the nozzle extending into the aperture;
- a closure valve disposed within the aperture, the nozzle in contact engagement with the closure valve;
- a cap locking element including a plurality of depressible buttons with cap locking tabs for secure engagement of the cap to the outer container with the inner container secured therein;
- wherein the first inner container being secured within the outer container via the nozzle locking element provides for dispensing of the toothpaste via the nozzle and through the aperture in response to an external compression force applied to the outer container, the closure valve securing the nozzle when not dispensing toothpaste;
- a second inner container insertable within the hollow interior cavity of the outer container;
- wherein the first inner container is disengaged from within the outer container, the second inner container engages the nozzle locking element to replace the first inner container therein; and
- a base component having a recess therein, the recess having a shape mating the cap, wherein the placement of the cap connected to the outer container rests within the base component to inhibit airflow to the closure valve.

10. The dispensing device of claim 9, wherein the outer container and the window are both made of a deformable plastic.

11. The dispensing device of claim 9, wherein the inner container is made of an at least partially see-through plastic material allowing visual confirmation of an interior toothpaste volume.

12. The dispensing device of claim 9 further comprising:
a lid affixed to the cap including at least one hinge mechanism for opening the lid to facilitate dispensing the paste from at least one of: the first inner container and the second inner container.

13. The dispensing device of claim 9 further comprising:
a timer element, which when activated tracks a preset time interval.

14. The dispensing device of claim 13, wherein the paste is a toothpaste and the preset time interval is a time interval for tooth brushing.

15. The dispensing device of claim 13, wherein the timer element is disposed within the outer container.

16. The dispensing device of claim 13, wherein activation of the timer element is based on the outer container.

* * * * *